United States Patent Office 3,493,354
Patented Feb. 3, 1970

3,493,354
DIESEL FUEL ADDITIVE
Neville Murray Jones, Blackwood, England, assignor to Monsanto Chemical Limited, London, England, a British company
No Drawing. Filed Feb. 27, 1967, Ser. No. 619,012
Int. Cl. C10l 1/22, 1/30
U.S. Cl. 44—57                13 Claims

ABSTRACT OF THE DISCLOSURE

Compositions prepared by mixing an organic barium compound, a quaternary ammonium salt and a water-immiscible solvent. These compositions are useful as additives in diesel fuel.

---

This invention relates to compositions useful as additives in diesel fuel, and to a process for their preparation.

Under certain conditions of operation, the exhaust gases from diesel engines contain a relatively high proportion of unburned hydrocarbons and suspended soot particles. The smoke produced is unpleasant and injurious to health, and moreover is indicative of inefficient utilization of the fuel.

It has been proposed to add compositions containing barium to diesel fuels with a view to improving certain aspects of the performance of the fuel. Many organic barium compounds such as for example barium phenates and barium sulphonates have the required solubility in water-immiscible solvents such as for instance hydrocarbons and it is possible to obtain solutions of such compounds having high concentrations of barium where the organic barium compound is present in association with barium carbonate. A shortcoming of such compositions was that the barium was present in such a form as to be susceptible to extraction or partial extraction by any water with which the composition or fuel containing the composition came into contact.

There has now been discovered compositions containing barium stabilized in water-soluble form by the presence of an organic nitrogen compound which compositions are useful as addition agents in diesel fuel to promote the combustion of the fuel, thereby reducing the proportion of unburned hydrocarbons and suspended soot particles in the exhaust gases of diesel engines.

The compositions of the present invention are comprised of (A) an organic barium compound, (B) an organic nitrogen compound selected from the group consisting of
(1) Amines represented by the formula

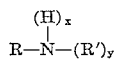

wherein R is selected from the group consisting of straight and branched chained $C_{6-22}$ alkyl radicals and straight and branched chained $C_{6-22}$ alkylene radicals, each R' is independently selected from the group consisting of $C_{1-22}$ alkyl radicals, $C_{1-22}$ alkylene radicals and substituted $C_{1-22}$ alkyl and alkylene radicals wherein the substituents are selected from the group consisting of aryl, aralkyl, hydroxyalkyl, alkyleneoxy, polyalkylenoxy and hydroxyalkylene radicals, $x$ and $y$ are integers from 0 to 2 provided $x+y$ is 2;
(2) Mixtures of (1);
(3) Compounds represented by the formula

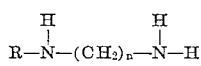

wherein R has the same meaning as above and $n$ is an integer from 2 to 6;
(4) Mixtures of (3);
(5) Quarternary ammonium salts represented by the formula

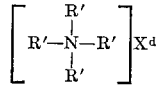

where each R' has the same meaning as above providing the total number of carbon atoms in all of the R' radicals is at least 12 and X is selected from the group consisting of halide and sulfate ions, $d$ is the valence of X and is an integer from 1 to 2; and
(6) Mixtures of (5) and
(C) A water immiscible solvent;
Wherein the amount of the organic nitrogen compound in the composition is less than the amount of the organic component of the organic barium compound.

In addition to the components specified above, the solution may also advantageously contain a stabilizing agent, in the absence of which a composition of the invention may show a tendency to deposit a sediment on long standing.

The organic barium compound in compositions of the invention can be, for example, a barium phenate, such as a barium alkyl phenate, a barium bis phenate, such as a barium alkylene (bis) phenate or barium thiobis phenate, a barium sulfonate, such as a barium petroleum sulfonate or barium alkylbenzene sulfonate, or a barium carboxylate, such as a barium aromatic carboxylate. The organic barium compound is preferably present in association with barium carbonate.

In the compositions of the present invention, the preferred organic barium compounds are the barium alkylphenates. Suitable barium alkylphenates can contain one or more alkyl groups, for example, from one to three alkyl groups, preferably at least one of which has 6 or more carbon atoms, for example, from 6 to 22 carbon atoms. Most preferred are mono-alkylphenates wherein the alkyl group contains from 8 to 18 carbon atoms, for example, barium octylphenate, barium nonylphenate, barium dodecylphenate, and barium octadecylphenate.

Barium petroleum sulfonates and barium alkylbenzene sulfonates that can be used are characterized by the presence in the molecule of a relatively long hydrocarbon chain, but there may also be present other hydrocarbon groupings, for example, cycloaliphatic groupings. Sulfonates derived from petroleum sulfonic acids and alkylbenzene sulfonic acids having molecular weights or average molecular weights in the range 300 to 600 are those generally used in practice.

Examples of barium aromatic carboxylates are barium benzoates and barium salicylates, more particularly alkylbenzoates and barium alkyl salicylates having at least one nuclear alkyl group containing 6 or more carbon atoms.

The amount of barium in a composition of the invention will generally be the maximum consistent with the solubility of the particular compound in the water immiscible solvent selected, and with the stability of the composition. In certain instances compositions containing 30% by weight of barium can be obtained, but more usually the barium represents from 15 to 25% by weight of the total composition. Where the barium is present as a complex of an organic barium compound and barium carbonate, the proportions of the total barium associated with the respective components of the complex can vary from about 2:1 to 1:5.

Where the organic nitrogen compound is an amine in compositions of the invention, the requirement for substantial water insolubility generally requires the presence in the amine of at least one aliphatic hydrocarbon group of 6 or more carbon atoms. Preferably the total number of carbon atoms in the amine is at least 12. The amine can be primary, secondary or tertiary. The primary amines may be generally represented by the formula $RNH_2$, where R has the same meaning as above. In practice, the group R normally contains not more than 22 carbon atoms. Examples of such amines are octylamine, dodecylamine, hexadecylamine, hexadecenylamine, heptadecylamine, heptadecenylamine, heptadecadienylamine, octadecylamine, octadecenylamine, octadecadienylamine, α-methyl heptadecylamine and α-methyl hexadecenylamine. Mixtures of such amines can also be used.

Suitable secondary amines include those having the formula $RR'NH$, where R and R' have the same significance as above. Included in secondary amines are those having substituted aliphatic hydrocarbon groups for instance a hydroxyethyl group, an α-hydroxy(polyalkyleneoxy) group, an aryl group for example phenyl, or an aralkyl group for example benzyl.

The suitable tertiary amines include those having the formula $RN(R^1)_2$ where R and $R^1$ have the same significance as above. A preferred sub-class of such amines are compounds having the formula

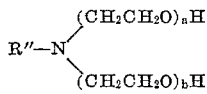

where $a$ and $b$ are each an integer from 1 to 5 and most preferred are compounds of this formula where $a$ and $b$ are both 1 and R'' is an aliphatic hydrocarbon radical containing from 16 to 20 carbon atoms.

A further class of amines useful in compositions of the invention can be selected are the alkylene diamines and polyalkylene polyamines in which at least one nitrogen atom is linked to an aliphatic hydrocarbon group of 6 or more carbon atoms.

The most suitable quaternary ammonium salts useful in the compositions of the invention are those containing at least two hydrocarbon groups, each of 6 or more carbon atoms, attached to the nitrogen atom. The remaining groups may be hydrocarbon groups each containing fewer than 6 carbon atoms, for instance, alkyl groups containing up to 4 carbon atoms. The hydrocarbon groups containing 6 or more carbon atoms in such compounds can be selected from for instance straight and branched chain, saturated or unsaturated, aliphatic hydrocarbon groups, preferably those containing from 6 to 22 carbon atoms, and aralkyl groups. Commercially available quaternary ammonium compounds, especially those containing aliphatic hydrocarbon groups of at least 6 carbon atoms are often mixtures of individual compounds in which the size of the hydrocarbon groups varies, for example, from $C_8$ to $C_{20}$. Such commercially available mixtures are suitable for use in the compositions of the present invention. Examples of preferred quaternary ammonium salts are the dimethyl dialkyl ammonium chlorides and bromides, in which the cation has the formula $(CH_3)_2NR'''_2^+$ where R''' is an alkyl $C_8H_{17}$ to $C_{18}H_{37}$ radical. In other instances R''' can be an olefinically unsaturated $C_8$ to $C_{18}$ group, for instance hexadecenyl, octadecenyl or octadecadienyl. Examples of other suitable quaternary ammonium salts are the alkenyldimethylethyl ammonium chlorides and bromides where the alkenyl group is octadecenyl or octadecadienyl, alkylbenzyldimethyl ammonium chlorides and bromides where alkyl can vary from $C_8H_{17}$ to $C_{18}H_{37}$ and the corresponding ethylbenzyl compounds, and the alkyltrimethyl ammonium chlorides and bromides where alkyl can vary from $C_9H_{19}$ to $C_{18}H_{37}$.

The optimum concentration of the organic nitrogen compound in the compositions of the invention will of course depend on the nature and proportions of the other components as well as on the nature of the compound itself, but is readily ascertainable and is generally within the range of from about 2 to about 12% by weight of the composition. Such a range taken in conjunction with the usual range of barium contents referred to above corresponds to a ratio by weight of organic nitrogen compound to barium in the composition of the invention of from about 1:1.25 to about 1:12.5.

In general, satisfactory compositions which contain from 2.5% to 7.5% by weight of organic nitrogen compound can be obtained by mixing such compound with a solution of the organic barium compound. Where a composition containing a primary amine having an aliphatic hydrocarbon group of from 12 to 22 carbon atoms is produced by a method in which the amine is present during the formation of the organic barium compound, it is sometimes advantageous to use a somewhat larger amount of the primary amine, equivalent, for example, to 8 to 12% of the total weight of the solution. In the case of the tertiary amines containing two ethoxyethyl groups, amounts of from 2 to 5% of the total weight of the solution are usually adequate, even where the amine is present during the formation of the organic barium compound.

The water-immiscible solvent in compositions of the invention are hydrocarbons and substituted hydrocarbons and mixtures thereof, preferably containing a significant content of aromatic hydrocarbons. The preferred water-immiscible solvent useful in compositions of this invention have an atmospheric boiling point of at least about 150° C. and petroleum naphthas having boiling point ranges with the broad range of from about 200° C. to about 300° C. Mixtures of such naphthas with, for example, diesel oil or kerosene, have been found to be especially suitable. Other hydrocarbons are, for example, mixed hexanes and heptanes, nonane, dodecane, toluene, benzene, xylene and mesitylene.

The substituted hydrocarbons can contain oxygen or halides and thus can be chlorinated hydrocarbon such as carbon tetrachloride, trichloroethylene, tetrachloroethylene, trichloro- and tetrachlorobenzene or an ester. Suitable esters are, for example, dicarboxylic acid esters such as esters of adipic and azelaic acids with alcohols such as butyl, 2-ethylhexyl and dodecyl alcohols. Also monocarboxylic acid esters such as the esters of butyric, caproic, caprylic, 2-ethylhexanoic, pelargonic, lauric, palmetic and stearic acids can be employed.

Substances that have been found to be especially suitable as stabilizing agents in the compositions of the invention are reaction products of alkenylsuccinic anhydrides with aliphatic amines, especially polyalkylene polyamines. The alkenylsuccinic anhydrides obtained by the addition to maleic anhydride of low molecular weight $C_{2-5}$ olefin polymer such as polypropylenes or polyisobutylenes containing, for example, from 50 to 100 carbon atoms. Also suitable as stabilizing agents are such alkenylsuccinic anhydride/aliphatic amine reaction products modified by reaction with one or more further components, for instance, carboxylic acids, aldehydes or boric oxide.

Alternatively there can be used as stabilizing agents metal-containing substances that are known as detergent additives for lubricating oils. These include alkaline earth metal derivatives of petroleum sulphonic acids, of phosphosulphurized terpenes and of phosphosulphurized polyolefins. The alkaline earth metal in such additives can be, for instance, calcium or barium. Where it is barium, the metal derivative can have the dual role of providing the barium in a soluble form and of stabilizing the composition, that is to say no other barium compound need be present.

The amount of stabilizing agent will vary according to the particular agent concerned, and the other components of the mixture. Usually, however, the effect of the stabilizing agent is not significant unless it is present to the extent of at least 0.5 percent of the total weight of the composition but it is not normally necessary to use more than 5%. An amount of stabilizing agent of from about 1% to about 3% of the total weight of the composition is generally satisfactory.

In the production of compositions of the invention, a preferred method for obtaining the organic barium compound comprises reacting a barium base, i.e., the oxide or hydroxide, with an organic acidic substance appropriate to give the required organic barium compound, using the water-immiscible solvent as the reaction medium. The term "organic acidic substance" is used to indicate an organic compound having one or more acidic hydrogen atoms replaceable by barium, and thus includes both acids such as carboxylic and sulphonic acids and phenols.

One of the preferred methods for the production of an organic barium compound/barium carbonate complex involves the reaction of part of the total quantity of barium base employed with the organic acidic substance, thus forming a solution of the organic barium compound, and conversion of the remainder to carbonate in the solution of the organic barium compound by contacting the solution with carbon dioxide. The reaction mixture can contain a lower alcohol, such as methanol, during the formation of the organic barium compound, and in such instance the effective barium base is probably the barium alkoxide.

In the production of a composition of the invention containing an amine, the amine may be present in the water-immiscible solvent during the formation of the organic barium compound or organic barium compound/barium carbonate complex as described above, or it may be subsequently added to a solution of the organic barium compound thus formed. For the production of a composition containing a quaternary ammonium salt, addition of the quaternary ammonium salt to a solution of the organic barium compound or organic barium compound/carbonate complex is generally the preferred method.

Another method for the production of a composition of the invention comprises forming a mixture of barium base, the organic acidic substance, a substantially water-insoluble amine, an alkanol containing not more than four carbon atoms per molecule and, if required, the stabilizing agent, in the water-immiscible solvent. In such a process, the amount of the alkanol is preferably at least the molar equivalent of the barium oxide. The addition of the alkanol to the mixture may follow or precede the addition of the barium base; the order of addition of the components generally is not critical. The formation of organic barium compounds in this way proceeds readily at temperatures of for instance from 40° to 100° C. For the production of an organic barium compound/barium carbonate complex by this method, the total quantity of barium base required for conversion to the organic barium compound and to barium carbonate can be added to the reaction mixture initially, and after allowing the formation of the organic barium compound to occur, the excess of barium base can be converted to carbonate by passing carbon dioxide into the reaction mixture. Preferably, however, at least a part of the barium base required for conversion to barium carbonate is added after the formation of the organic barium compound. The additional barium base so added may be the oxide or the hydroxide. In a further modification, the barium base required for conversion to carbonate can be introduced in portions, each portion being converted to carbonate before the introduction of the next portion.

Where barium oxide and an alkanol are used to form the organic barium compound, the conversion of additional barium oxide to barium carbonate generally proceeds more smoothly if the alkanol is removed from the reaction mixture before carbonation is started. This allows carbonation to be effected at temperatures in excess of 120° C., for example, at temperatures of from 130 to 160° C. On the other hand, carbonation in the presence of the alkanol is possible, but somewhat lower operating temperatures are then required.

When barium hydroxide is used as the barium base no alkanol is required in the reaction mixture. All of the barium hydroxide required for conversion to the organic barium compound and to barium carbonate can be present in the initial reaction mixture. To ensure high conversions of the organic acidic substance to the corresponding organic barium compound, it is preferable that at least the bulk of the water produced by this reaction should be removed from the reaction system. Such removal is conveniently effected by having present a solvent compatible with the reaction mixture and which forms an azeotrope with water. Toluene or benzene are especially suitable for this purpose. The formation of the organic barium compound takes place at the boiling point of the azeotrope, which is distilled from the reaction mixture. The water is thereby continuously removed as it is formed, while, if desired, the solvent component of the azeotrope can be recycled to the reaction system.

Through the use of an azeotrope, the reaction system can be substantially completely dehydrated before conversion of the excess barium hydroxide to carbonate, but it has been found that products are more readily filtered in a subsequent stage of the process if the carbonation is carried out in the presence of a small amount of water. Effective amounts of water are generally with the range of from 1.0% to 3.0% by weight of the total reaction mixture, the most effective amount being from 2.0% to 2.5%. Dehydration during the first stage of the process may accordingly be terminated when the reaction mixture has a water content of the required magnitude, or alternatively the reaction mixture can be substantially completely dehydrated following the formation of the organic barium compound, and the requisite amount of water added before carbonating the excess barium hydroxide.

Final treatment of products made using either barium oxide and an alkanol or barium hydroxide usually includes subjection to an elevated temperature under reduced pressure to remove traces of volatile materials such as alkanol, toluene and water, and a filtration operation.

By carrying out the above processes in the presence of a substantially water-insoluble amine, compositions of the invention can be obtained directly. Essentially the same processes, carried out in the absence of an amine, can be used to produce solutions of organic barium compounds or organic barium compound/carbonate complexes in water-immiscible solvents. Compositions of the invention are then obtainable from such solutions simply by mixing with a substantially water-insoluble amine or quaternary ammonium compound. The invention is illustrated by the following examples.

EXAMPLE 1

To a suitable reaction vessel there were added 98.5 grams of nonyl phenol, 11.5 grams of a reaction product of polybutyl succinic anhydride and tetraethylene pentamine, 45 grams of a mixture of amines containing 20 percent hexadecylamine, 17 percent octadecylamine, 26 percent octadecenylamine and 37 percent octadecadienylamine, and 200 grams of a petroleum naphtha solvent having a distillation range of 208° C. to 260° C. The mixture was heated to 40° C. to effect solution. To the solution there was added 65 grams of barium oxide with stirring, whereupon the temperature rose to 75° C. after which 90 cc. of methanol were added slowly. The reaction mixture was refluxed for 30 minutes and then distilled to a pot temperature of 150° C. At 150° C. a vacuum was applied to effect complete removal of the methanol. Carbon dioxide was then passed into the mixture at 150° C. until no further absorption occurred. The temperature was maintained at 150° C. and a vacuum was applied to remove any traces of water.

The mixture was cooled to 65° C. and 65 grams of barium oxide and 90 cc. of methanol were added. The mixture was again refluxed, distilled and carbonated as before. The filtered product contained 22.74 percent by weight of barium.

The following test was employed to show that the barium was present in the composition in an essentially hydrophobic form. A sample of diesel fuel containing 0.5 percent by volume of the composition of Example 1 was shaken with one percent of water for five minutes and allowed to stand for 24 hours. The mixture separated into two distinct layers. Examination of the aqueous layer showed no trace of barium.

The effectiveness of the composition of Example 1 in reducing the amount of smoke from the exhaust of a diesel engine was demonstrated in the following manner. A four-cylinder Ford "Trader" engine was set at three quarter load and 1,800 revolutions per minute, and the fuel rate was increased independently of the governor until the exhaust smoke gave a reading on the "Hartridge" scale of 70 using normal fuel. Without altering the engine setting the fuel was then switched to a test blend incorporating 0.5 percent by volume of the additive prepared according to Example 1. In a few minutes a reduction of smoke content of 50 percent ("Hartridge" scale of 35) could be observed in stable conditions.

No sediment was observed even when fuel containing the additive had been stored for a prolonged period.

EXAMPLE 2

A composition was prepared in a similar manner to that described in Example 1 except that the amine mixture referred to in that example was replaced by 13.5 grams of a mixture of bis (hydroxyethyl) amines having an average molecular weight of 350, and wherein the third group attached to the nitrogen atom was derived from soybean oil of which the principal constituent was probably bis (hydroxyethyl) linolenylamine.

The product obtained in this way had emulsion and storage stabilities comparable with those of the product of Example 1, and was equally effective as a smoke suppressant in diesel fuel.

EXAMPLE 3

This example describes the production of a barium-containing composition by an alternative process to that described in Example 1.

A reactor equipped with a stirrer, a Dean Stark trap and a gas inlet tube was charged with 98.5 grams of nonyl phenol, 11.5 grams of a polybutenyl succinic anhydride, 15 grams of a mixture of bis (hydroxyethyl) amines having an average molecular weight of 350 and containing bis (hydroxyethyl) linolenylamine as the principal component, 115 grams of a petroleum naphtha solvent having a distillation range of 208–260° C., 115 grams of a gas oil and 180 cc. of toluene. The mixture was stirred at 40° C. until homogeneous, then 168 grams of barium hydroxide monohydrate were added, and the temperature was increased to the boiling point. Water which separated from the toluene-water azeotrope in the Dean Stark arm was collected, and refluxing of the mixture was continued until the quantity of water removed corresponded to a residual water content of 2.4% by weight of the mixture.

The mixture was then cooled to 100–105° C., the Dean Stark arm was replaced by a condenser set for distillation, and carbon dioxide was passed into the reaction mixture at this temperature until absorption was complete i.e., the outlet rate of carbon dioxide equalled the inlet rate. A small amount of water and toluene distilled from the mixture under these conditions. The temperature was then gradually raised to 140° C. thereby removing by distillation the bulk of the remainder of the water and toluene. Final traces of water and toluene were removed by holding the batch under vacuum at 130–140° C. for 30 minutes. A filter aid was stirred into the mixture which then filtered readily to give 469 grams of a clear dark red product containing 23.8% by weight of barium.

EXAMPLE 4

A solution of a barium nonylphenate/barium carbonate complex was obtained by essentially the method described in Example 3 but omitting the bis (hydroxyethyl) amines.

Compositions according to the invention were prepared by adding to 95 parts by weight of the solution of Example 4 5 parts by weight of each of the following, giving 100 parts by weight of the composition in each instance:

(1) Oleylamine.
(2) A mixture of primary amines derived from coconut oil, principal component being laurylamine.
(3) A mixture of amines derived from soybean oil, principal component being N-linolenyl-1,3-propylenediamine.
(4) The mixture of bis (hydroxyethyl) amines used in Example 2.
(5) A 75%, by weight, solution of dialkyldimethyl-ammonium chlorides in propanol, in which the alkyl groups are octyl, decyl, dodecyl, tetradecyl, hexadecyl, octadecyl, octadecenyl and octadecadienyl.

In the foregoing description, the term "composition" usually signifies a concentrate which is intended to be diluted with diesel oil to give an improved diesel fuel. Such concentrates can, for example, be added to diesel fuel in the proportions of from 0.1 to 1 part by volume per 100 parts of volume of fuel, the normal optimum range being from 0.4 to 0.6 part by volume per 100 parts by volume of fuel.

The embodiments of this invention in which an exclusive property or privilege is claimed are defined as follows:

1. A composition consisting of a mixture of:

(A)

an organic barium compound selected from the group consisting of barium phenates, barium sulfonates and barium carboxylates (B)

(1) quaternary ammonium salts represented by the formula

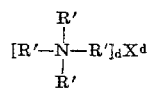

where each $R'$ is independently selected from the group consisting of $C_{1-22}$ alkyl radicals, $C_{1-22}$ alkylene radicals and substituted $C_{1-22}$ alkyl and alkylene radicals wherein the substituents are selected from the group consisting of aryl, aralkyl, hydroxyalkyl, alkyleneoxy, polyalkyleneoxy and hydroxyalkylene radicals, providing the total number of carbon atoms in all of the $R'$ radicals is at least 12 and $X$ is selected from the group consisting of halide and sulfate ions, $d$ is the valence of $X$ and is an integer from 1 to 2; and (2) mixtures of (1) and (C)

A water-immiscible solvent;

wherein the ratio by weight of the quaternary ammonium compound to the oragnic component of the organic barium compound is in the range of from 1:1.25 to 1:12.5.

2. A composition of claim 1 wherein $X$ is a halide ion.
3. A composition of claim 2 wherein the quaternary ammonium salt is a dimethyldialkyl ammonium chloride.
4. A composition of claim 1 in which the quaternary ammonium salt is from about 2% to about 12% by weight of the composition.

5. A composition of claim 1 wherein the water-immiscible solvent is an aliphatic hydrocarbon having an atmospheric boiling point above about 150° C.

6. A composition of claim 1 wherein the water-immiscible solvent is petroleum naphtha having an atmospheric boiling point range of from about 200° C. to about 300° C.

7. A composition of claim 1 and from 1% to 3% by weight of a reaction product of an alkenylsuccinic anhydride and a polyalkylene polyamine.

8. A composition according to claim 6 in which the organic barium compound is from 15 to 25% of the total weight of the composition.

9. A composition of claim 1 wherein the organic barium compound is present in association with barium carbonate.

10. A composition of claim 1 wherein the organic barium compound is a barium alkylphenate.

11. A composition of claim 10 wherein the barium alkylphenate is a barium monoalkylphenate wherein the alkyl group contains from 8 to 18 carbon atoms.

12. A composition of claim 1 wherein the organic barium compound is from 15 to 25% of the total weight of the composition.

13. An improved diesel fuel comprising a mixture of from 0.1 to 1 part by volume of a composition according to claim 1 per 100 parts by volume of diesel fuel.

References Cited

UNITED STATES PATENTS

| | | | |
|---|---|---|---|
| 2,684,292 | 7/1954 | Caron et al. | 44—72 X |
| 2,945,749 | 7/1960 | Andress | 44—72 |
| 3,008,813 | 11/1961 | Siegel | 44—72 X |
| 3,084,034 | 4/1963 | Kalinowski | 44—72 X |
| 3,092,475 | 6/1963 | Cole et al. | 44—72 |
| 3,102,797 | 9/1963 | Udelhofen | 44—72 |
| 3,244,491 | 4/1966 | Marsh et al. | 44—72 X |
| 3,282,836 | 11/1966 | Miller et al. | 44—71 X |
| 3,410,670 | 11/1968 | LeSuer | 44—57 |
| 3,415,632 | 12/1968 | Rechberger | 44—57 |

FOREIGN PATENTS 661,907  2/1965  Belgium.

DANIEL E. WYMAN, Primary Examiner

W. J. SHINE, Assistant Examiner

U.S. Cl. X.R.

44—70, 72, 76, 78